(12) United States Patent
Herrington et al.

(10) Patent No.: US 11,069,173 B2
(45) Date of Patent: Jul. 20, 2021

(54) TAP TO COPY DATA TO CLIPBOARD VIA NFC

(71) Applicant: Capital One Services, LLC, McLean, VA (US)

(72) Inventors: Daniel Herrington, New York, NY (US); Jeffrey Rule, Chevy Chase, MD (US); Colin Hart, Arlington, VA (US); Jason Ji, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/998,499

(22) Filed: Aug. 20, 2020

(65) Prior Publication Data
US 2020/0380811 A1 Dec. 3, 2020

Related U.S. Application Data

(63) Continuation of application No. 16/522,380, filed on Jul. 25, 2019, now Pat. No. 10,783,736, which is a continuation of application No. 16/359,966, filed on Mar. 20, 2019, now Pat. No. 10,438,437.

(51) Int. Cl.
| | |
|---|---|
| *G07F 7/08* | (2006.01) |
| *G06F 9/54* | (2006.01) |
| *G06Q 20/32* | (2012.01) |
| *H04W 4/80* | (2018.01) |

(52) U.S. Cl.
CPC ............ *G07F 7/0893* (2013.01); *G06F 9/543* (2013.01); *G06Q 20/322* (2013.01); *G07F 7/084* (2013.01); *G07F 7/0813* (2013.01); *H04W 4/80* (2018.02)

(58) Field of Classification Search
CPC ........ G07F 7/0893; G07F 7/10; G07F 7/1016; G07F 7/08; G06Q 20/322; G06Q 20/204; G06Q 20/3278; G06K 19/07; G06K 7/084
See application file for complete search history.

(56) References Cited

U.S. PATENT DOCUMENTS

| | | | | |
|---|---|---|---|---|
| 9,805,370 | B1* | 10/2017 | Quigley | G06Q 20/3278 |
| 10,026,078 | B1* | 7/2018 | Nolan | G06Q 20/3572 |
| 10,410,023 | B2* | 9/2019 | Zhu | H04B 5/02 |
| 10,438,437 | B1* | 10/2019 | Herrington | H04W 4/80 |
| 10,510,074 | B1* | 12/2019 | Rule | G06Q 20/385 |
| 10,636,241 | B1* | 4/2020 | Rule | G07F 7/0893 |
| 10,664,941 | B1* | 5/2020 | Osborn | G06F 21/32 |
| 10,713,649 | B1* | 7/2020 | Rule | G06Q 20/354 |
| 10,783,519 | B2* | 9/2020 | Herrington | H04L 9/002 |
| 10,783,736 | B1* | 9/2020 | Herrington | G07F 7/084 |
| 10,885,410 | B1* | 1/2021 | Rule | G06Q 20/322 |

(Continued)

*Primary Examiner* — Daniel I Walsh
(74) *Attorney, Agent, or Firm* — Kacvinsky Daisak Bluni PLLC

(57) ABSTRACT

Various embodiments are generally directed to copying data to a clipboard of a mobile device from a contactless card using NFC. A mobile device may issue a request to read data from the contactless card. The contactless card may generate encrypted data in response to the request. The mobile device may receive the encrypted data via NFC and transmit the encrypted data to a server for verification. The server may verify the encrypted data and transmit an indication of an account number for the contactless card to the mobile device. The mobile device may then copy the account number to a clipboard of the mobile device.

20 Claims, 11 Drawing Sheets

(56) References Cited

U.S. PATENT DOCUMENTS

| | | | | |
|---|---|---|---|---|
| 2007/0136211 A1* | 6/2007 | Brown | G06Q 20/385 | 705/75 |
| 2008/0040276 A1* | 2/2008 | Hammad | G06Q 20/3821 | 705/44 |
| 2009/0156238 A1* | 6/2009 | Smith | G06Q 20/3552 | 455/466 |
| 2009/0307132 A1* | 12/2009 | Phillips | G06Q 40/00 | 705/41 |
| 2011/0101095 A1* | 5/2011 | Bales, Jr. | G06Q 20/206 | 235/382 |
| 2011/0112918 A1* | 5/2011 | Mestre | G06Q 20/349 | 705/16 |
| 2011/0195748 A1* | 8/2011 | Main | G06Q 20/204 | 455/557 |
| 2012/0205450 A1* | 8/2012 | Poidomani | G06K 19/06206 | 235/492 |
| 2013/0018738 A1* | 1/2013 | Faires | G06Q 20/36 | 705/16 |
| 2013/0041746 A1* | 2/2013 | Hollander | G06Q 20/325 | 705/14.38 |
| 2013/0200146 A1* | 8/2013 | Moghadam | G06Q 20/3672 | 235/379 |
| 2014/0025513 A1* | 1/2014 | Cooke | G06Q 20/20 | 705/17 |
| 2014/0081729 A1* | 3/2014 | Ocher | G06Q 30/0222 | 705/14.23 |
| 2014/0138435 A1* | 5/2014 | Khalid | G06Q 20/352 | 235/380 |
| 2015/0206147 A1* | 7/2015 | Stanfield | G06Q 20/24 | 705/41 |
| 2015/0269555 A1* | 9/2015 | Clark | G06Q 20/3221 | 705/39 |
| 2015/0269786 A1* | 9/2015 | Cowen | G07B 15/02 | 705/13 |
| 2015/0296362 A1* | 10/2015 | Chukka | H04M 15/64 | 455/408 |
| 2015/0348001 A1* | 12/2015 | Van Os | G06Q 20/3821 | 705/44 |
| 2015/0371234 A1* | 12/2015 | Huang | G06Q 20/20 | 705/44 |
| 2018/0039986 A1* | 2/2018 | Essebag | G06Q 20/352 | |
| 2019/0392417 A1* | 12/2019 | Li | G06Q 20/40 | |
| 2020/0104830 A1* | 4/2020 | Hart | G06Q 20/352 | |
| 2020/0184482 A1* | 6/2020 | Sharma | G06Q 20/3278 | |
| 2020/0242588 A1* | 7/2020 | Rule | G06Q 20/363 | |

* cited by examiner

TAP TO COPY DATA TO CLIPBOARD VIA NFC

RELATED APPLICATIONS

This application is a continuation of U.S. patent application Ser. No. 16/522,380, filed on Jul. 25, 2019, which is a continuation of U.S. patent application Ser. No. 16/359,966, now U.S. Pat. No. 10,438,437, filed on Mar. 20, 2019, both titled "TAP TO COPY DATA TO CLIPBOARD VIA NFC". The contents of the aforementioned applications are incorporated herein by reference in their entirety.

TECHNICAL FIELD

Embodiments herein generally relate to mobile computing platforms, and more specifically, to tap to copy data to a clipboard via near-field communication (NFC).

BACKGROUND

Account identifiers for payment cards are often long numeric and/or character strings. As such, it is difficult for a user to manually enter the account identifier correctly. Indeed, users often make mistakes and enter incorrect account numbers into computing interfaces (e.g., payment interfaces). Furthermore, even if the user enters the correct account identifier, processes have been developed that allow cameras to capture the account identifier.

SUMMARY

Embodiments disclosed herein provide systems, methods, articles of manufacture, and computer-readable media for tapping to copy data to a clipboard via NFC. According to one example, an application may receive encrypted data from a communications interface of a contactless card associated with an account, the encrypted data generated based on one or more cryptographic algorithms and a diversified key, the diversified key stored in a memory of the contactless card and generated based on a master key and a counter value stored in the memory of the contactless card. The application may then receive, from a server, verification of the encrypted data, the server to decrypt the encrypted data based on one or more cryptographic algorithms and the diversified key stored in a memory of the server to verify the encrypted data, the diversified key stored in the memory of the server generated based on a master key and a counter value stored in the memory of the server. The application may further receive, from the server, an encrypted account number associated with the account. The application may decrypt the encrypted account number to yield the account number. The application may then copy the account number to a clipboard of an operating system (OS) executing on the processor circuit.

DETAILED DESCRIPTION

Figure 1A:
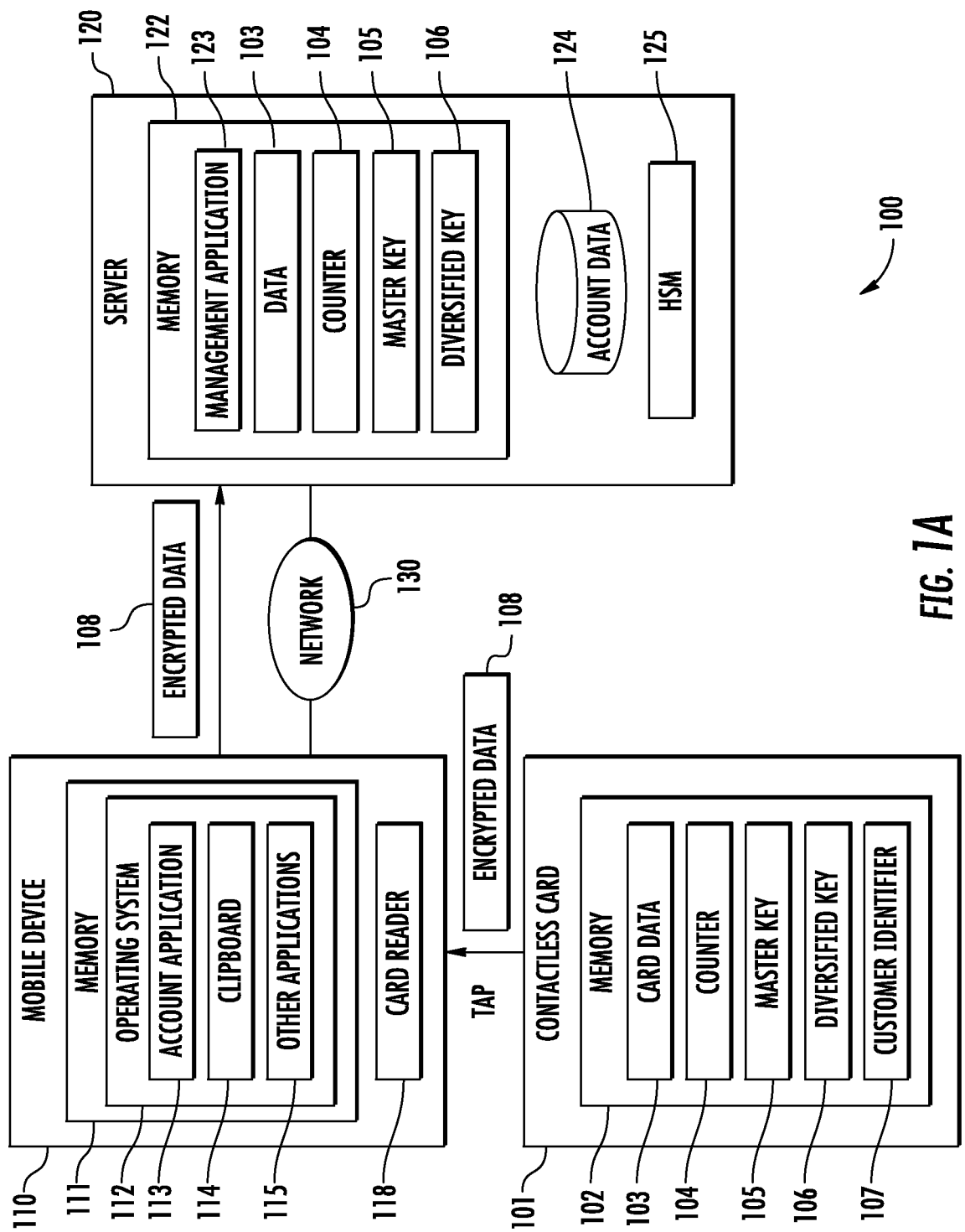
FIGS. 1A-1B illustrate embodiments of a system for tapping to copy data to a clipboard via NFC.

Embodiments disclosed herein provide secure techniques for copying data (e.g., an account number) from a contactless card to the clipboard of a computing device using NFC. Generally, a user of a device may provide input to an application specifying to copy the data from the contactless card. The contactless card may then come into NFC communications range with the device, e.g., via a tapping gesture. The application may then instruct the contactless card to generate and transmit data to the application via NFC. The data generated by the contactless card may be encrypted using key diversification. The application may transmit the data received from the contactless card to a server for verification. Upon verifying the data, the server may transmit account data (e.g., an account number) to the application on the device, which may then copy the received account data to a clipboard of the operating system of the device. The account data may be maintained on the clipboard until a purchase is made, or the expiration of a time threshold, at which point the clipboard contents may be wiped, overwritten, or otherwise modified. Advantageously, doing so improves security of all devices and associated data.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, and a server 120. The contactless cards 101 are representative of any type of payment card, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication, or using NFC Data Exchange Format (NDEF) tags. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, compute cluster, cloud computing platform, virtualized computing system, and the like.

As shown, a memory 102 of the contactless card 101 includes data 103, a counter 104, a master key 105, a diversified key 106, and a unique customer identifier 107. The data 103 generally includes any data that can be copied to the clipboard 114 such as characters, text, executable code, images, or other types of data objects. In one embodiment, the data 103 may comprise an account number, expiration date, and card verification value (CVV) associated with the contactless card 101. The account number may be any type of account number, such as a primary account number (PAN), a virtual account number, and/or a token generated based on the PAN. Other types of account numbers are contemplated, and the use of any particular type of account number as examples herein should not be considered limiting of the disclosure. The data 103 may further include names, billing addresses, shipping addresses, usernames and/or passwords, one-time use codes for multifactor authentication, personalized uniform resource locators (URLs), gift card numbers, drivers license information, passport information, loyalty program information, loyalty points, phone numbers, email addresses, contact information, access information, and the like. Other types of data 103 are contemplated, and the use of any type of data 103 as examples herein should not be considered limiting of the disclosure.

As shown, a memory 111 of the mobile device 110 includes an instance of an operating system (OS) 112. Example operating systems 112 include the Android® OS, iOS®, Linux®, and Windows® operating systems. As shown, the OS 112 includes an account application 113, a clipboard 114, and one or more other applications 115. The account application 113 allows users to perform various account-related operations, such as viewing account balances and processing payments as described in greater detail below. Initially, a user must authenticate using authentication credentials to access the account application. For example, the authentication credentials may include a username and password, biometric credentials, and the like. The clipboard 114 stores data that can be copied and/or pasted within the OS 112. For example, as discussed in greater detail below, an account number of an account associated with a contactless card 101 (e.g., a portion of the data 103) may be programmatically copied to the clipboard 114 in a secure manner using a command and/or gesture available within the OS 112. The account number may then be pasted from the clipboard 114 to the account application 113, other applications 115, and/or other components of the OS 112 using a command and/or gesture available within the OS 112. In at least one embodiment, the clipboard 114 includes a single data field for all elements of the data 103. In other embodiments, the clipboard 114 includes multiple data fields, with at least one field for each element of the data 103 (e.g., a field for an account number, a field for an expiration date, a field for a CVV number, a field for a first name, and a field for a last name, etc.).

As shown, the server 120 includes a data store of account data 124 and a memory 122. The account data 124 includes account-related data for a plurality of users and/or accounts. The account data 124 may include at least a master key 105, counter 104, a customer ID 107, an associated contactless card 101, and biographical information for each account. The memory 122 includes a management application 123 and instances of the data 103, the counter 104, master key 105, and diversified key 106 for one or more accounts from the account data 124.

Generally, the system 100 is configured to implement key diversification to secure data. The server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (or stored in a different secure location). The master key may be kept secret from all parties other than the contactless card 101 and server 120, thereby enhancing security of the system 100. Other examples of key diversification techniques are described in U.S. patent application Ser. No. 16/205,119, filed Nov. 29, 2018. The aforementioned patent application is incorporated by reference herein in its entirety.

The master keys 105 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 118 of the mobile device 110. Card reader 118 may be configured to read from and/or communicate with contactless card 101 (e.g., via NFC, Bluetooth, RFID, etc.). Therefore, example card readers 118 include NFC communication modules, Bluetooth communication modules, and/or RFID communication modules.

For example, a user may tap the contactless card 101 to the mobile device 110, thereby bringing the contactless card 101 sufficiently close to the card reader 118 of the mobile device 110 to enable NFC data transfer between the contactless card 101 and the card reader 118 of the mobile device 110. After communication has been established between client device 110 and contactless card 101, the contactless card 101 generates a message authentication code (MAC) cryptogram. In some examples, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value 104 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server 120 for verification as explained below. However, in some embodiments, the mobile device 110 may verify the MAC cryptogram.

More generally, when preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 101 may then encrypt the data (e.g., the customer identifier 107 and any other data) using the diversified key 106. The contactless card 101 may then transmit the encrypted data to the account application 113 of the mobile device 110 (e.g., via an NFC connection, Bluetooth connection, etc.). The account application 113 of the mobile device 110 may then transmit the encrypted data to the server 120 via the network 130. In at least one embodiment, the contactless card 101 transmits the counter value 104 with the encrypted data. In such embodiments, the contactless card 101 may transmit an encrypted counter value 104, or an unencrypted counter value 104.

Upon receiving the data, the management application 123 of the server 120 may perform the same symmetric encryption using the counter value 104 as input to the encryption, and the master key 105 as the key for the encryption. As stated, the counter value 104 may be specified in the data received from the mobile device 110, or a counter value 104 maintained by the server 120 to implement key diversification for the contactless card 101. The output of the encryption may be the same diversified key value 106 that was created by the contactless card 101. The management application 123 may then decrypt the encrypted data received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account.

Although the counter 104 is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In some examples, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In some examples, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

As stated, data such as the data 103 of the contactless card 101 and/or the server 120 may securely be copied to the clipboard 114. In some embodiments, one or more data elements of the data 103 are received directly from the contactless card 101 and copied to the clipboard. For example, the account number, expiration date, and CVV of the contactless card 101 may be received from the data 103 in one or more data packages from the contactless card 101. In some embodiments, the contactless card 101 may encrypt the requested elements of data 103 and transmit a data package comprising the encrypted data 103 that can be parsed by the account application 113 and copied to the clipboard 114 responsive to receiving an indication of successful authentication of encrypted data generated by the contactless card 101 (e.g., by the server 120). In other embodiments, the server 120 may authenticate encrypted data generated by the contactless card 101 and transmit data 103 stored in the server 120 in one or more data packages to the account application 113 which may copy the data 103 received from the server 120 to the clipboard 114. In embodiments where the data 103 is transmitted to the mobile device 110 in a single package (e.g., from the card 101 and/or the server 120), the single data package may include delimiters and or metadata that allow the account application 113 to parse and extract each element of data 103 (e.g., account number, expiration date, CVV, billing address, and/or shipping address).

For example, a user of the account application 113 may specify to copy data to the clipboard 114. In response, the account application 113 may instruct the user to tap the contactless card 101 to the mobile device 110. Doing so causes the account application 113 to generate and transmit an indication to the contactless card 101 to generate an encrypted data 108. In response, the contactless card 101 increments the counter value 104 and provides the master key 105 and counter value 104 as input to a cryptographic algorithm, which produces a diversified key 106 as output. The contactless card 101 may then encrypt the customer identifier 107 using the diversified key 106 to generate the encrypted data 108. As stated, in some embodiments, the contactless card 101 may further encrypt the data 103 and include the encrypted data 103 as part of the encrypted data 108. The contactless card 101 may then transmit the encrypted data 108 to the account application 113 of the mobile device 110 (e.g., via an NFC connection, Bluetooth connection, etc.). The account application 113 of the mobile device 110 may then transmit the encrypted data 108 to the server 120 via the network 130. In at least one embodiment, the contactless card 101 transmits the counter value 104 along with the encrypted data 108.

Upon receipt of the encrypted data 108, the management application 123 of the server 120 may verify the encrypted data 108 using key diversification. As stated, the management application 123 of the server 120 may perform the same symmetric encryption using the counter value 104 as input to the encryption, and the master key 105 as the key for the encryption, to generate the diversified key 106. The management application 123 may then decrypt the encrypted data 108 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account, where a match of the customer ID values verifies the encrypted data received from the contactless card 101.

If the management application 123 successfully verifies the encrypted data 108, the management application 123 may transmit an indication of the verification to the account application 113. As stated, in some embodiments, the encrypted data 108 generated by the contactless card 101 may include the data 103. Therefore, responsive to receiving the indication of verification from the management application 123, the account application 113 decrypts and parses the encrypted data 108 received from the contactless card 101 to copy the decrypted data 103 to the clipboard 114. As stated, in some embodiments, management application 123 may further transmit the requested data 103 from the server 120 to the account application 113. In such embodiments, the account application 113 may copy the data 103 received from the server 120 to the clipboard 114.

In at least one embodiment, a time threshold may be applied to a request to copy data to the clipboard 114. In such embodiments, the account application 113 may notify the server 120 that a request to copy data to the clipboard 114 has been initiated. The server 120 may then start a timer. If the timer value exceeds the time threshold, the server 120 may refrain from validating the encrypted data 108, refrain from transmitting an indication of validation of the encrypted data 108, and/or refrain from transmitting data 103 from the server 120 to the account application 113. For example, if the server 120 receives the encrypted data 108 from the contactless card 101 via the mobile device 110 15 seconds after starting the timer, and the time threshold is 30 seconds, the server 120 may validate the encrypted data 108 and transmit the data 103 from the server 120 to the mobile device 110. If, however, the server 120 receives the encrypted data 108 from the contactless card 101 via the mobile device 110 45 seconds after starting the timer, the server 120 may refrain from validating the encrypted data 108 and transmit a failure state to the account application 113, which may refrain from copying data to the clipboard 114.

Figure 1B:
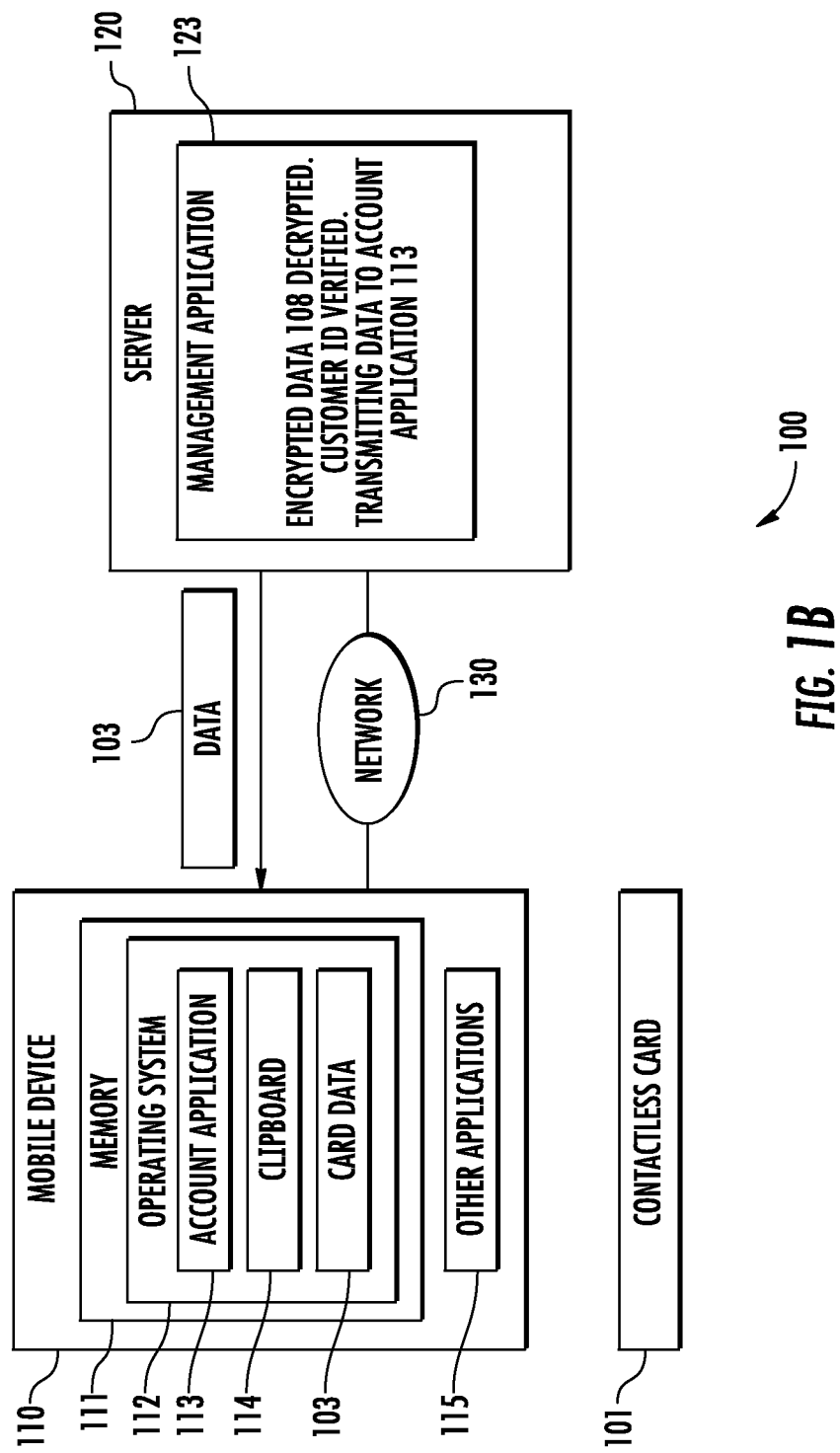

FIG. 1B depicts a result of the verification process performed by the management application 123. As shown, after verifying the encrypted data 108, the management application 123 of the server 120 transmits the data 103 from the server 120 to the mobile device 110. In at least one embodiment, the management application 123 encrypts the data 103 before sending to the account application 113. As stated, the data 103 may include the account number, CVV, expiration date, and/or billing address of the contactless card 101. Furthermore, as stated, the account number may comprise a single-use virtual account number. The account application 113 may then receive the data 103 and decrypt the received data 103 if the data 103 has been encrypted. The account application 113 may then programmatically write the data 103 to the clipboard 114 without requiring user input and without exposing the data 103. For example, the OS 112 may provide an application programming interface (API) for copying data to the clipboard 114. Therefore, the account application 113 may make a call to the API which includes the data 103 to be copied to the clipboard 114. A result of the API call may copy the provided data 103 to the clipboard 114. As another example, the account application 113 may directly copy the data 103 to the clipboard using one or more code statements supported by the OS 112. Once copied to the clipboard 114, the user may easily paste the data 103 from the clipboard 114 to other targets within the OS 112 using a command and/or gesture available within the OS 112.

In some embodiments, the data 103 copied to the clipboard 114 all relevant information (e.g., the account number, expiration date, CVV, billing address, and/or shipping address) required to make a purchase using the account associated with the contactless card 101. However, in other embodiments, the individual elements of the data 103 may be incrementally copied to the clipboard 114 using one or more taps of the contactless card 101 and the mobile device 110. For example, a first tap of the contactless card 101 and the mobile device 110 may copy the account number of the data 103 to the clipboard 114, while a second tap of the contactless card 101 and the mobile device 110 may copy the expiration date to the clipboard 114, a third tap of the contactless card 101 and the mobile device 110 may copy the CVV to the clipboard 114, a fourth tap of the contactless card 101 may copy the shipping address to the clipboard 114, and a fifth tap of the contactless card 101 may copy the billing address to the clipboard 114. In one embodiment, a separate package of encrypted data 108 is generated by the contactless card 101 responsive to each tap, and the server 120 verifies each package of encrypted data 108 before copying the corresponding data 103 to the clipboard 114. In some embodiments, a single package of the encrypted data 108 is generated responsive to the initial tap and the server 120 verifies the single package of encrypted data 108. In some such embodiments, the account application 113 may receive the data 103 from the server 120 in a single package having delimiters and/or metadata that identifies each data element in the data 103 (e.g., the account number, expiration, date, CVV, billing address, and/or shipping address). The account application 113 may parse the data elements using the delimiters and/or metadata to extract each element of data from the single package of data 103 received from the server. The account application 113 may then copy the parsed data to the clipboard responsive to each tap of the contactless card 101 and the mobile device 110. In some such embodiments, the account application 113 may parse the data 103 based on the current fields displayed on the device 110. For example, if the account number field is current selected and/or displayed on the device 110, the account application 113 may parse the account number from the data 103 and copy the account number to the clipboard 114.

Furthermore, in some embodiments, the clipboard 114 may be hypertext markup language (HTML)-based. In such embodiments, the data 103 may be wrapped in HTML. For example, the account number may be wrapped in HTML indicating the presence of the account number. The expiration date, CVV, and addresses may similarly be wrapped in HTML. Therefore, when pasting from the clipboard 114, the HTML and the data 103 are pasted to the target (e.g., a form in the OS 112, account application 113, and/or the other applications 115). In at least one embodiment, the clipboard 114 and/or the OS 112 may parse the form in light of the data 103 and/or the generated HTML to associate the data 103 and/or generated HTML with the fields of the form. For example, doing so allows the account number, expiration date, CVV, billing address, and shipping address to be pasted into the correct fields of the form, even though the form may use different HTML tags for the fields.

Further still, the account application 113 and/or the OS 112 may manage the data 103 copied to the clipboard 114. For example, the data 103 may be deleted from the clipboard 114 after the data 103 has been stored in the clipboard 114 for a predefined amount of time. As another example, the data 103 may be deleted from the clipboard 114 after the data 103 has been used to make a purchase, e.g., after a threshold amount of time has elapsed since the data 103 has been used to make a purchase. In addition and/or alternatively, the clipboard 114 may be modified to remove the data 103, e.g., by copying random data to the clipboard 114.

Figure 2:
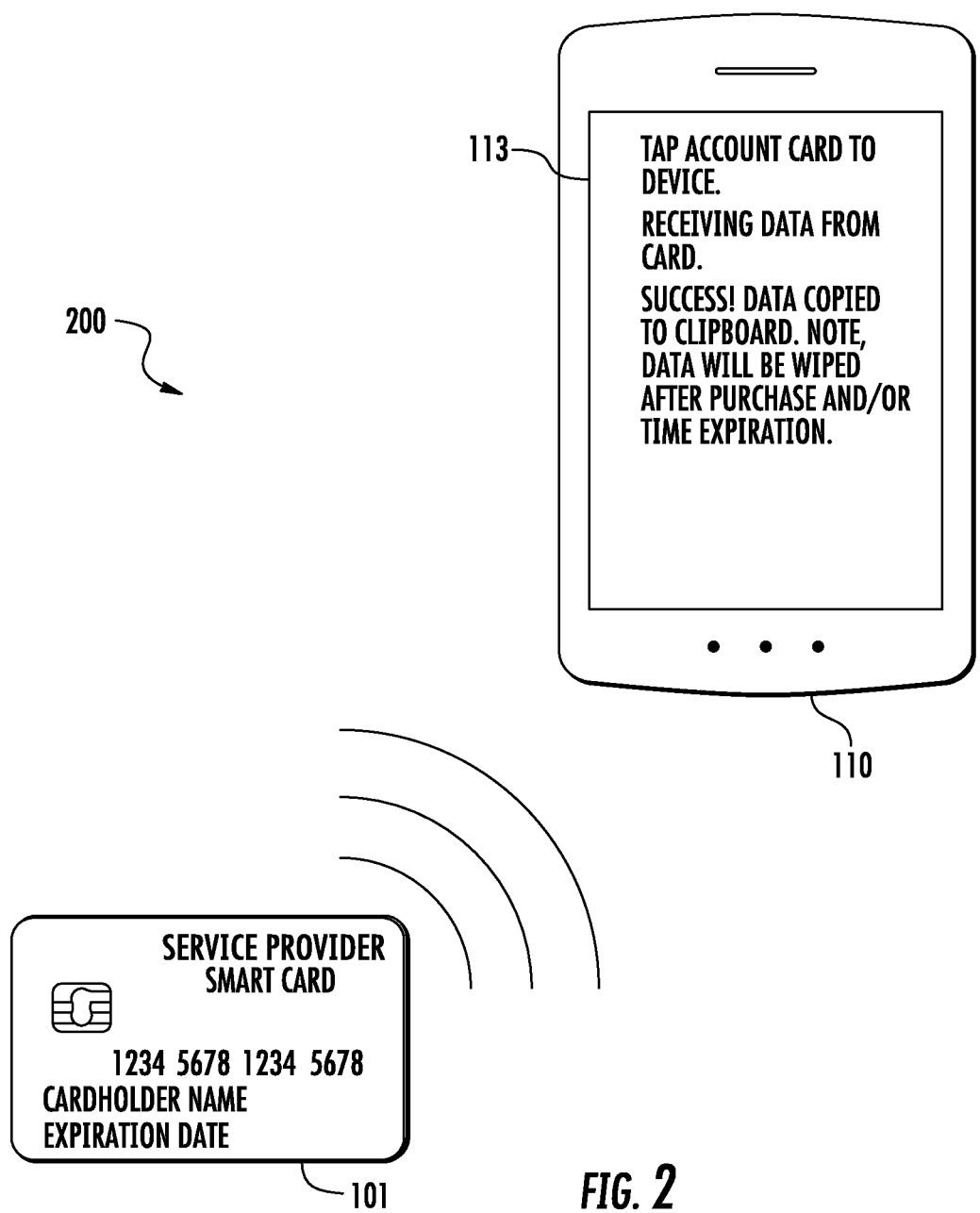
FIG. 2 illustrates an embodiment of tapping to copy data to a clipboard via NFC.

FIG. 2 is a schematic 200 depicting an example embodiment of tapping to copy data to a clipboard via NFC. Generally, the schematic 200 depicts an embodiment where the account application 113 reads the data 103 directly from the contactless card 101 (e.g., via the card reader 118). As shown, the account application 113 on the mobile device 110 may specify to tap the contactless card 101 to the mobile device 110, e.g., responsive to receiving user input specifying to copy data from the contactless card 101 to the clipboard 114. Once the contactless card 101 is tapped to the mobile device 110, the account application 113 transmits, via the NFC card reader 118, an indication to the contactless card 101 to transmit the data 103. The contactless card 101 may then transmit the data 103 to the account application 113 via NFC. The account application 113 may then copy the received data 103 to the clipboard 114. As stated, the data 103 may include one or more of an account number, expiration date, and CVV. The data 103 may then be pasted from the clipboard 114 to any number and types of targets within the OS 112.

Figure 3B:
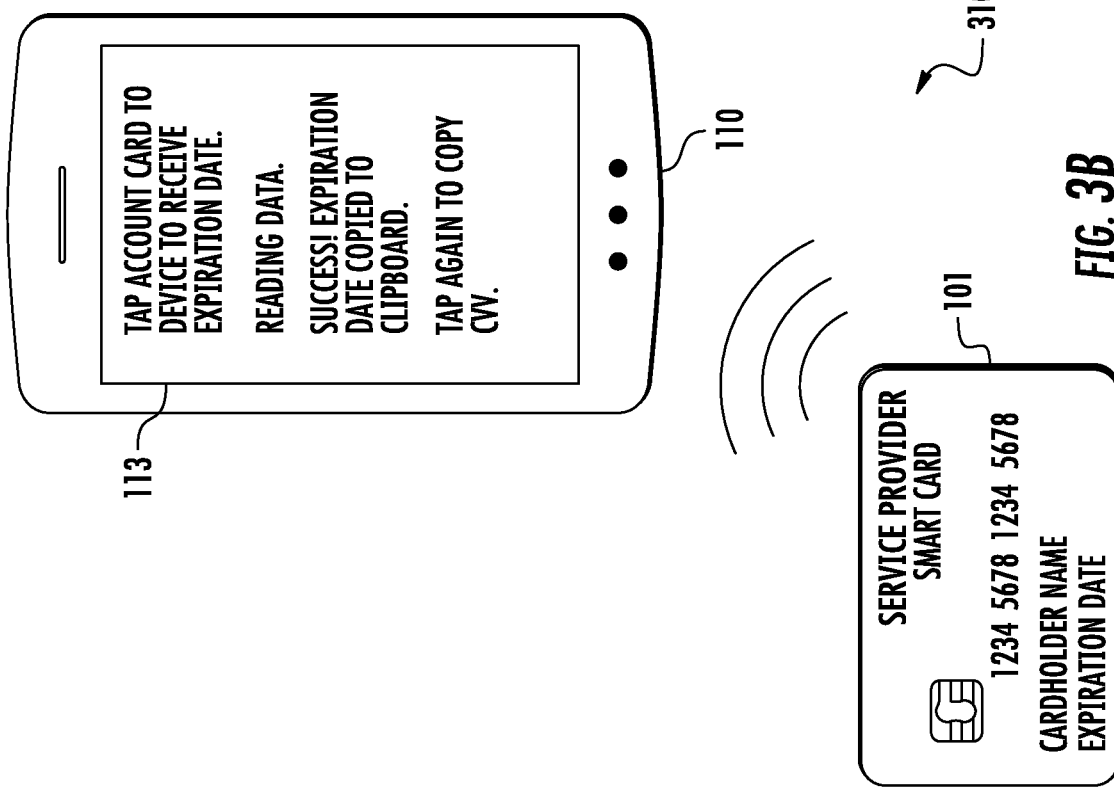
FIGS. 3A-3C illustrate embodiments of tapping to copy data to a clipboard via NFC.
Figure 3A:
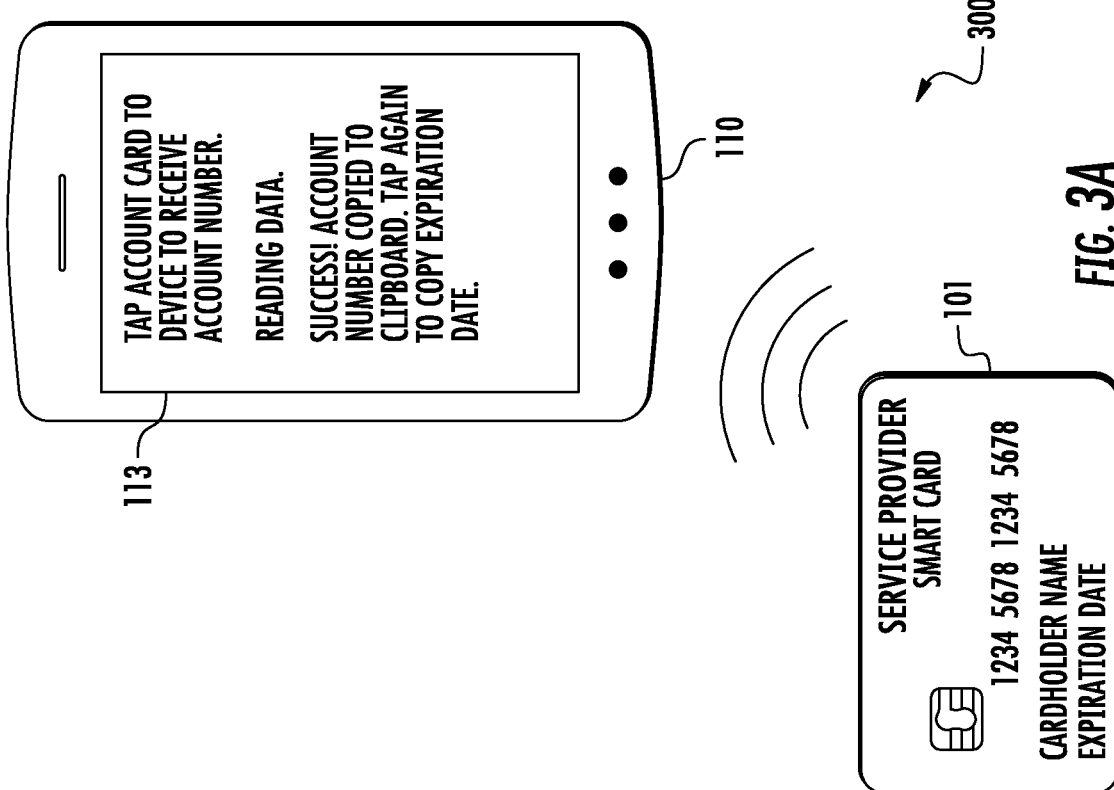

FIG. 3A is a schematic 300 depicting an example embodiment of tapping to copy data to a clipboard via NFC. Generally, FIG. 3A reflects an embodiment where a single tap is used to copy the account number of the data 103. As shown, the account application 113 on the mobile device 110 may specify to tap the contactless card 101 to the mobile device 110, e.g., responsive to receiving user input specifying to copy data 103 to the clipboard 114. Once the contactless card 101 is tapped to the mobile device 110, the account application 113 transmits, via the NFC card reader 118, an indication to the contactless card 101 to transmit data. In one embodiment, the contactless card 101 transmits the account number directly to the mobile device 110 via NFC, where the card reader 118 provides the received data to the account application 113, which then copies the account number to the clipboard 114. In such an embodiment, an applet of the contactless card 101 (e.g., an applet 440 of FIG. 4B) may maintain a counter value to determine to transmit the account number and increment the counter value responsive to each tap. In such an embodiment, at least one counter value is associated with transmitting the account number, at least one other counter value is associated with transmitting the expiration date, and at least one other counter value is associated with transmitting the CVV.

In another embodiment, the contactless card 101 may perform encryption using key diversification as described above to generate encrypted data (e.g., the encrypted data 108), and transmit the encrypted data to the account application 113. The account application 113 may then transmit the encrypted data to the server 120, where the management application 123 verifies the encrypted data using key diversification as described above. The management application 123 may then transmit the account number to the account application 113, which then copies the account number to the clipboard 114.

Regardless of the technique used to copy the account number of the contactless card 101 to the clipboard 114, the user may then paste the account number as desired. Furthermore, if desired, the user may tap the contactless card 101 to the mobile device 110 an additional time to copy the expiration date of the contactless card 101 to the clipboard 114.

FIG. 3B is a schematic 310 depicting an example embodiment where the user has tapped the contactless card 101 to the mobile device 110 to copy the expiration date of the contactless card 101 to the clipboard 114. Once the contactless card 101 is tapped to the mobile device 110, the account application 113 transmits, via the NFC card reader 118, an indication to the contactless card 101 to transmit data. In one embodiment, the contactless card 101 transmits the expiration date directly to the mobile device 110 via NFC, where the account application 113 then copies the expiration date to the clipboard 114. In such an embodiment, the applet of the contactless card 101 may increment the counter value responsive to the tap and reference the counter value to determine to transmit the expiration date.

In another embodiment, the contactless card 101 may perform encryption using key diversification as described above to generate encrypted data (e.g., the encrypted data 108), and transmit the encrypted data to the account application 113. The account application 113 may then transmit the encrypted data to the server 120, where the management application 123 verifies the encrypted data using key diversification as described above. The management application 123 may then transmit the expiration date to the account application 113, which then copies the expiration date to the clipboard 114. Doing so allows the user to paste the expiration date as desired. Furthermore, if desired, the user may tap the contactless card 101 to the mobile device 110 an additional time to copy the CVV of the contactless card 101 to the clipboard 114.

Figure 3C:
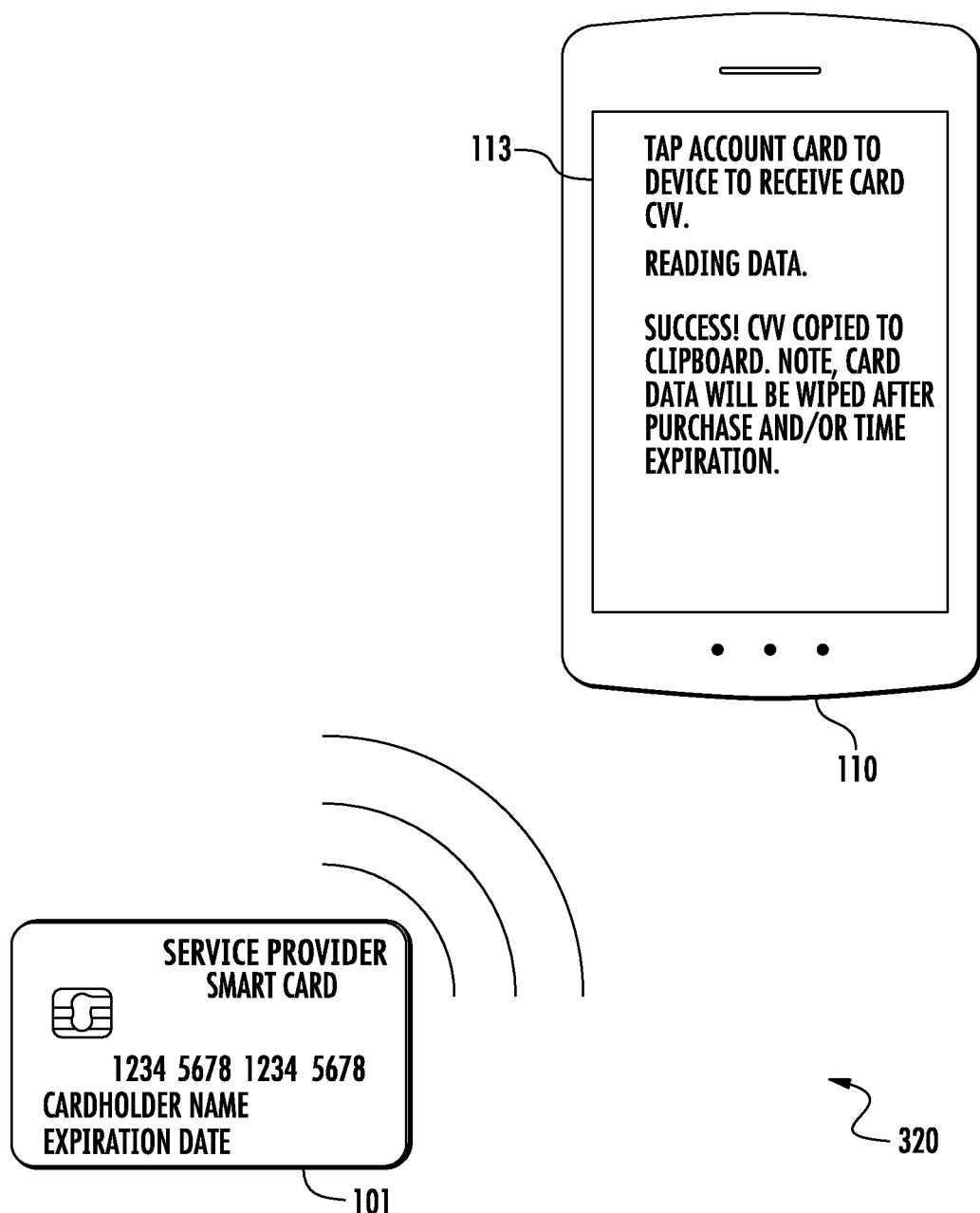

FIG. 3C is a schematic 320 depicting an example embodiment where the user has tapped the contactless card 101 to the mobile device 110 to copy the CVV of the contactless card 101 to the clipboard 114. Once the contactless card 101 is tapped to the mobile device 110, the account application 113 transmits, via the NFC card reader 118, an indication to the contactless card 101 to transmit data. In one embodiment, the contactless card 101 transmits the CVV directly to the mobile device 110 via NFC. The card reader 118 may then provide the CVV to the account application 113, which then copies the CVV to the clipboard 114. In such an embodiment, the applet of the contactless card 101 may increment the counter value responsive to the tap and reference the counter value to determine to transmit the CVV.

In another embodiment, the contactless card 101 may perform encryption using key diversification as described above to generate encrypted data (e.g., the encrypted data 108), and transmit the encrypted data to the account application 113. The account application 113 may then transmit the encrypted data to the server 120, where the management application 123 verifies the encrypted data using key diversification as described above. The management application 123 may then transmit the CVV to the account application 113, which then copies the CVV to the clipboard 114. Doing so allows the user to paste the CVV as desired.

In some embodiments, the initial tap of the contactless card 101 to the mobile device 110 (e.g., the tap depicted in FIG. 3A) causes the contactless card 101 and/or the server 120 to transfer the account number, expiration date, and the CVV to the account application 113 (e.g., in an NDEF file). In such an embodiment, the account application 113 copies the account number from the NDEF file to the clipboard 114 responsive to the first tap. Responsive to the second tap, the account application 113 copies the expiration date from the NDEF file to the clipboard 114 without having to receive any additional data from the contactless card 101 and/or the server 120. Responsive to the third tap, the account application 113 copies the CVV from the NDEF file to the clipboard 114 without having to receive any additional data from the contactless card 101 and/or the server 120.

Figure 4A:
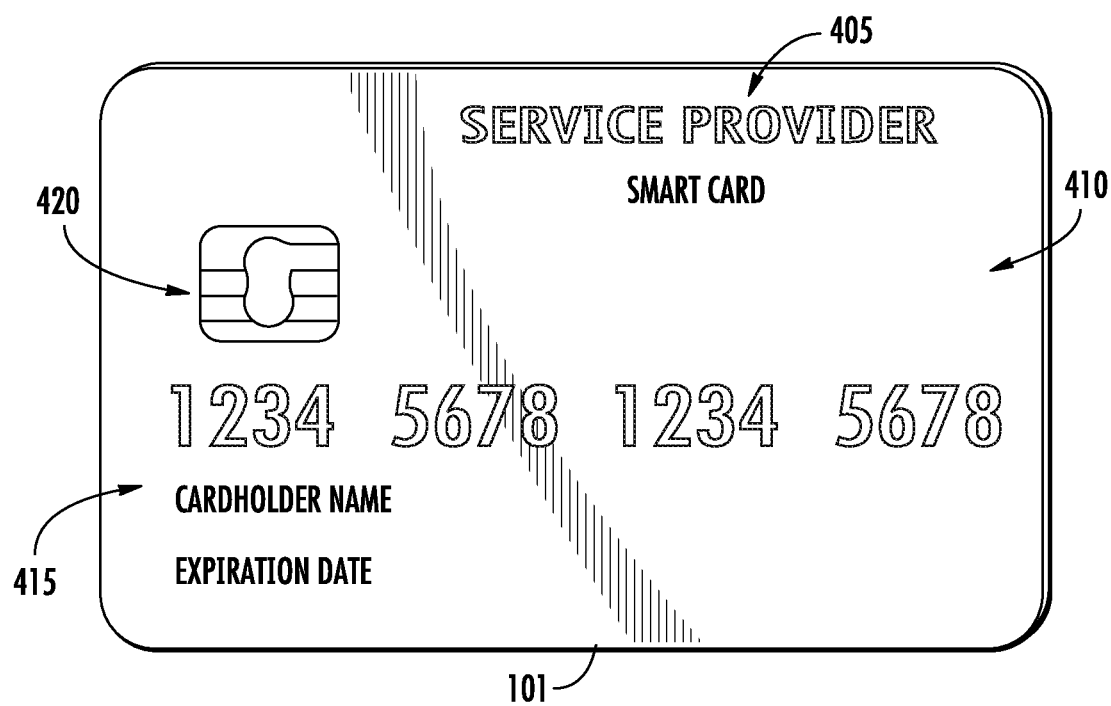
FIGS. 4A-4B illustrate an example contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A).

Figure 4B:
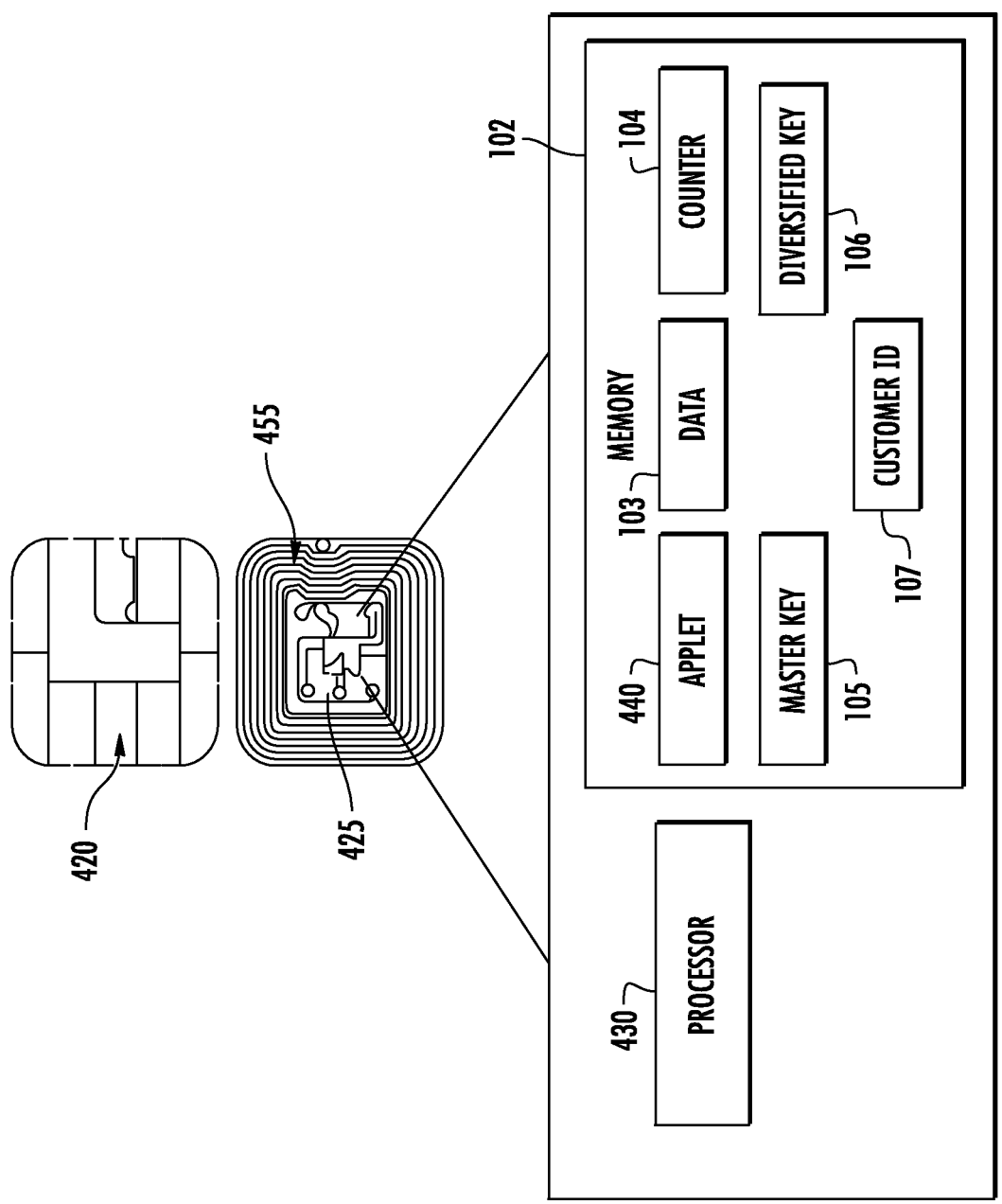

As illustrated in FIG. 4B, the contact pad 420 of FIG. 4A may include processing circuitry 425 for storing and processing information, including a microprocessor 430 and a memory 102. It is understood that the processing circuitry 425 may contain additional components, including processors, memories, error and parity/CRC checkers, data encoders, anticollision algorithms, controllers, command decoders, security primitives and tamperproofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 440, one or more elements of data 103, one or more counters 104, a master key 105, a diversified key 106, and a customer identifier 107. The one or more applets 440 may comprise one or more software applications configured to execute on one or more contactless cards, such as a Java® Card applet. However, it is understood that applets 440 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 101, and the identifier may distinguish the user of the contactless card from other contactless card users. In some examples, the customer identifier 107 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In some examples, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

Figure 5:
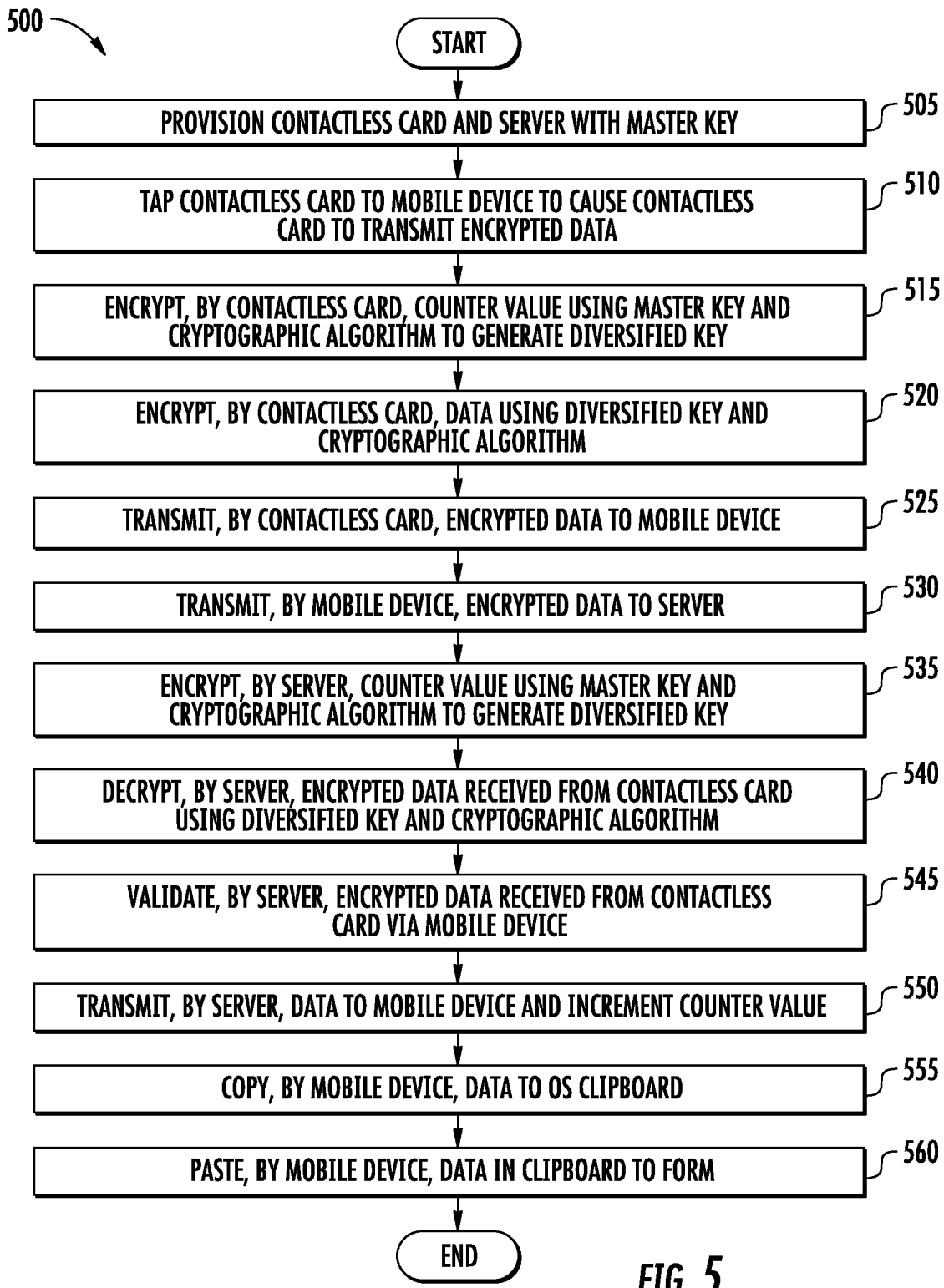
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to securely copy data associated with a contactless card 101 using key diversification. Embodiments are not limited in this context.

As shown, the logic flow 500 begins at block 505, where the contactless card 101 and the server 120 are provisioned with the same master key 105. At block 510, a user taps the contactless card 101 to the mobile device to cause the contactless card 101 to generate and transmit encrypted data (e.g., the encrypted data 108). The user may tap the contactless card 101 responsive to providing input to the account application 113 specifying to copy the data 103 to the clipboard. The account application 113 may transmit an indication to the contactless card 101 via the NFC card reader 118 specifying to generate and transmit encrypted data. The contactless card 101 may increment the counter value 104 in the memory 102 responsive to receiving the indication to generate encrypted data. At block 515, the contactless card 101 generates the diversified key 106 using the counter value 104 and the master key 105 in the memory 102 and a cryptographic algorithm. At block 520, the contactless card 101 encrypts data (e.g., the customer identifier 107) using the diversified key 106 and the cryptographic algorithm, generating encrypted data (e.g., the encrypted data 108).

At block 525, the contactless card 101 may transmit the encrypted data to the account application 113 of the mobile device 110 using NFC. In at least one embodiment, the contactless card 101 further includes an indication of the counter value 104 along with the encrypted data. At block 530, the account application 113 of the mobile device 110 may transmit the data received from the contactless card 101 to the management application 123 of the server 120. At block 535, the management application 123 of the server 120 may generate a diversified key 106 using the master key 105 and the counter value 104 as input to a cryptographic algorithm. In one embodiment, the management application 123 uses the counter value 104 provided by the contactless card 101. In another embodiment, the management application 123 increments the counter value 104 in the memory 122 to synchronize the state of the counter value 104 in the memory 122 with the counter value 104 in the memory 102 of the contactless card 101.

At block 540, the management application 123 decrypts the encrypted data received from the contactless card 101 via the mobile device 110 using the diversified key 106 and a cryptographic algorithm. Doing so may yield at least the customer identifier 107. By yielding the customer identifier 107, the management application 123 may validate the data received from the contactless card 101 at block 545. For example, the management application 123 may compare the customer identifier 107 to a customer identifier for the associated account in the account data 124, and validate the data based on a match.

At block 550, the management application 123 may transmit data 103 associated with the contactless card 101 to the account application 113 of the mobile device 110. For example, the management application 123 may transmit the account number, expiration date, and CVV. In one embodiment, the management application 123 generates a virtual account number that is sent to the account application 113 of the mobile device 110. At block 555, the account application 113 of the mobile device 110 copies the data 103 received from the server 120 to the clipboard 114 of the OS 112. At block 560, the data 103 that has been copied to the clipboard 114 may be pasted to a form. The form may be a component of the account application 113, the other applications 115, and/or the OS 112.

Figure 6:
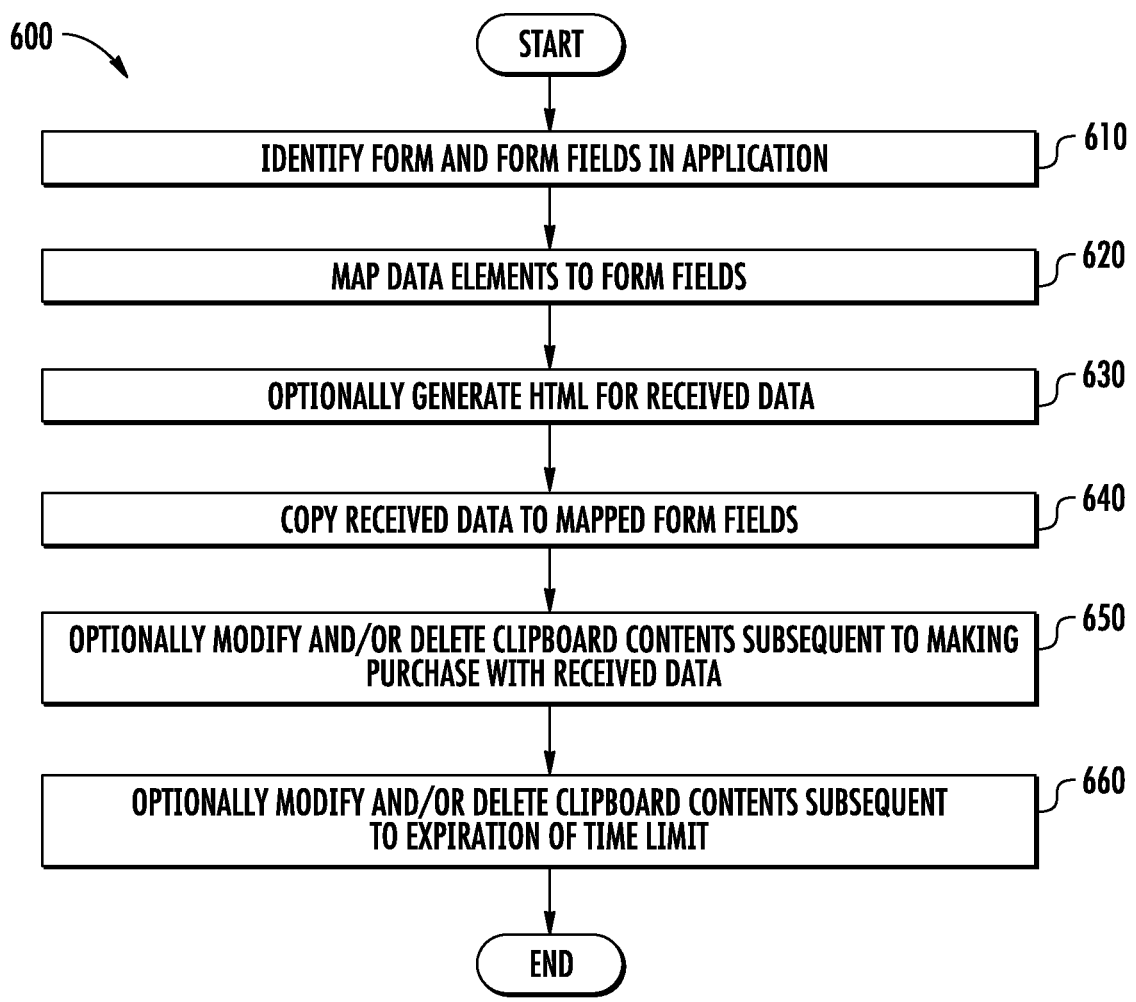
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations to paste data from the clipboard 114 to an application form. Embodiments are not limited in this context.

As shown, the logic flow 600 begins at block 610, where the account application 113 and/or the OS 112 identifies a form comprising form fields in an application. The application may be the account application 113 and/or one or more of the other applications 115. For example, the account application 113 and/or the OS 112 may parse the source code of the form to identify the fields of the form. At block 620, the account application 113 and/or the OS 112 may map the elements of data 103 copied to the clipboard 114 (e.g., the account number, expiration date, and/or CVV) to a corresponding form field. For example, the account application 113 and/or the OS 112 may use fuzzy matching and/or rules to map the account number, expiration date, and CVV to the appropriate fields of the form.

At block 630, the account application 113 and/or the OS 112 may optionally generate HTML for the data 103 stored in the clipboard 114, thereby adding the HTML to the data 103 in the clipboard 114. Doing so may allow the account application 113 and/or the OS 112 to inject the data 103 into the form. At block 640, the account application 113 and/or the OS 112 copies the data 103 to the mapped form fields. At block 650, the account application 113 and/or the OS 112 may modify and/or delete the contents of the clipboard 114 subsequent to a purchase being made with the data 103 of the contactless card 101. At block 660, the account application 113 and/or the OS 112 may modify and/or delete the contents of the clipboard 114 subsequent to the expiration of a time limit for storing the data 103 in the clipboard 114. Doing so enhances the security of the data 103, such as account numbers, identification information, account information, etc.

Figure 7:
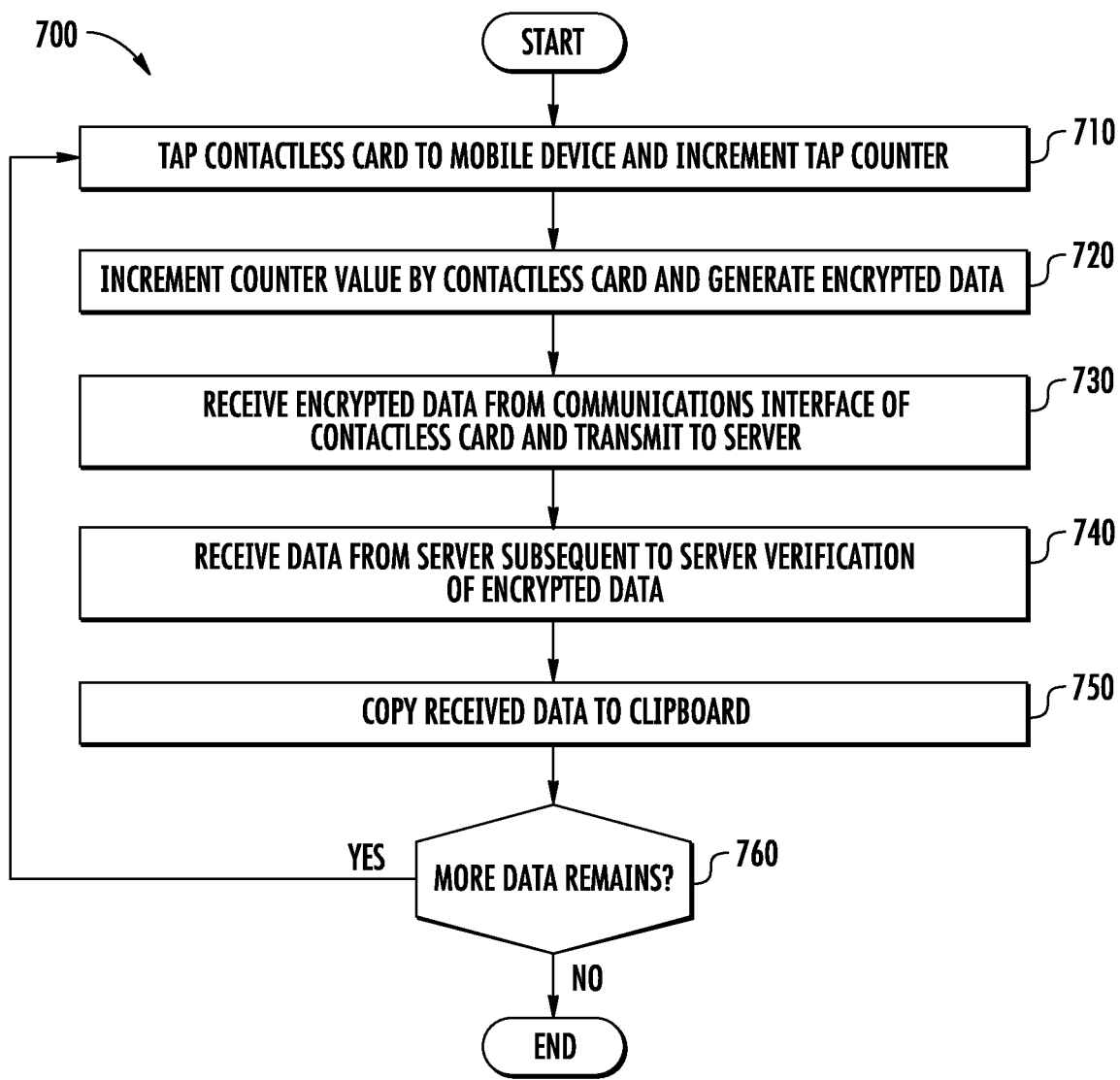
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may include some or all of the operations to copy data 103 to a clipboard 114 using multiple taps of a contactless card 101 to a mobile device 110. Embodiments are not limited in this context.

As shown, the logic flow 700 begins at block 710, where the user taps the contactless card 101 to the mobile device 110. Doing so causes the account application 113 to transmit an indication to the contactless card 101 to generate encrypted data using key diversification. The account application 113 may further increment a tap counter responsive to the tap. At block 720, the contactless card 101 increments the counter value 104 and generate the encrypted data 108 as described above. At block 730, the account application 113 receives the encrypted data 108 from the contactless card 101 via NFC and transmits the encrypted data 108 to the server 120. The server 120 may then verify the encrypted data 108 using key diversification as described above. At block 740, the account application 113 receives the data 103 from the server 120 after the server 120 verifies the encrypted data 108. The data 103 may include one or more of the account number, expiration date, and CVV associated with the contactless card 101.

At block 750, the account application 113 may copy the data 103 to the clipboard 114. As stated, the account application 113 may paste one element of data based on the current value of the tap counter. For example, a counter value associated with a first tap of the contactless card 101 to the mobile device 110 may be associated with copying the account number to the clipboard 114. Similarly, a counter value associated with a second tap may be associated with copying the expiration date to the clipboard 114, while a counter value associated with a third tap may be associated with copying the CVV to the clipboard 114. At block 760, the account application 113 determines whether more data 103 remains. For example, if the tap counter indicates that the account number has been copied to the clipboard 114, the account application 113 may determine that the expiration date and/or the CVV remain to be copied to the clipboard 114. As such, the logic flow 700 returns to block 710. Otherwise, the logic flow 700 ends.

In some examples, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card 101 may be tapped to a device, such as the mobile device 110. As explained above, identity of the user may be verified by the one or more applications which would then grant the user a desired benefit based on verification of the identity.

In some embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. Some point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card 101 can selectively communicate information depending upon the recipient device. Once tapped, the contactless card 101 can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card 101, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards 101 to provide information to initiate one or more payment requests from the card-tapping individual.

In some examples, the present disclosure refers to a tap of the contactless card. However, it is understood that the present disclosure is not limited to a tap, and that the present disclosure includes other gestures (e.g., a wave or other movement of the card).

Figure 8:
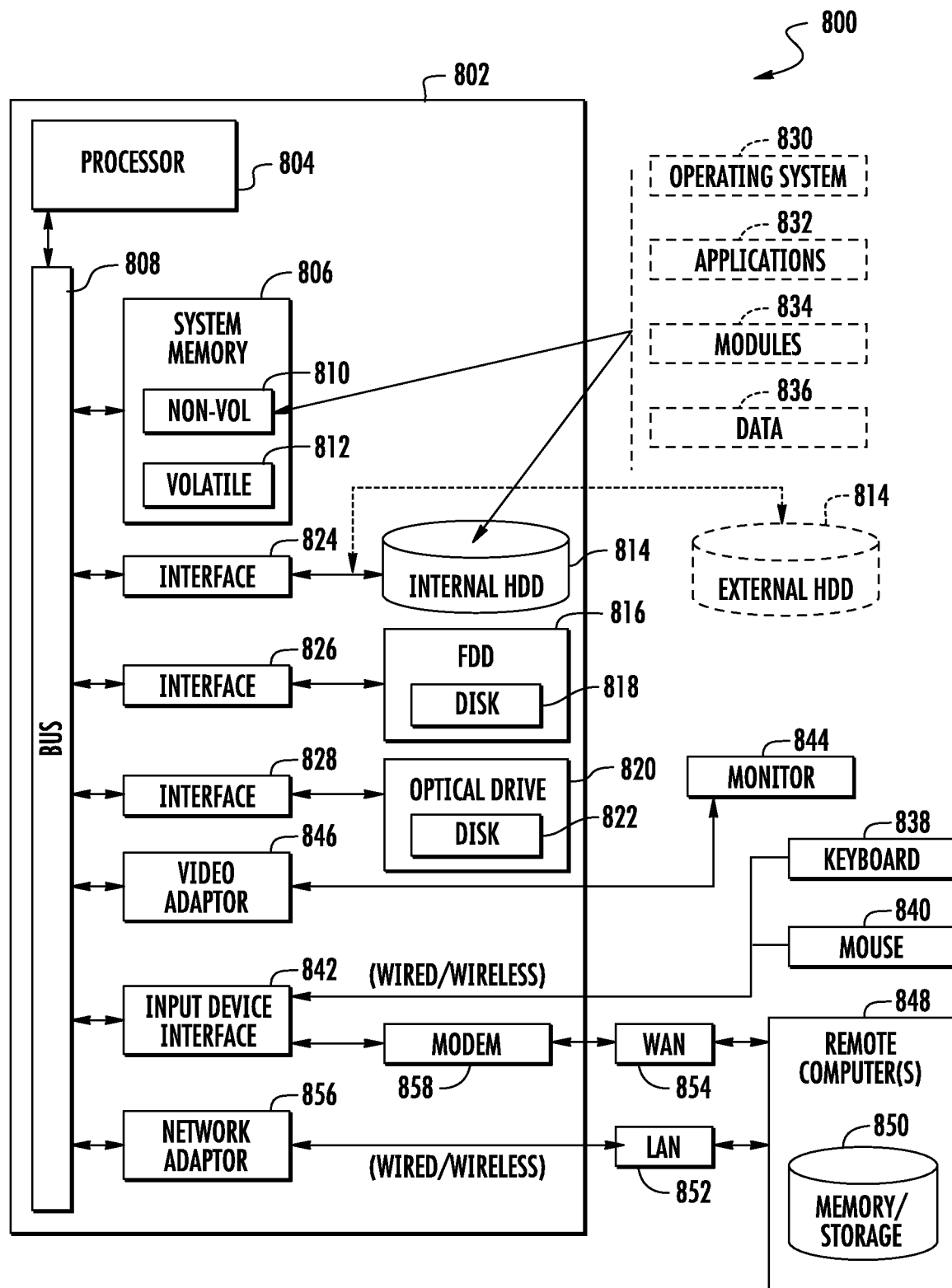
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the mobile devices 110 and server 120 of the system 100. The embodiments are not limited in this context. More generally, the computing architecture 800 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the operating system 112, account application 113, clipboard 114, other applications 115, and the management application 123.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   detecting, by an application executing on a device, a plurality of taps of a contactless card to the device, the contactless card associated with an account, wherein each of the plurality of taps brings the card within wireless communications range of the device for a transaction, wherein each respective tap causes a different data set to be wirelessly transmitted to the application for the transaction;
   incrementing, by the application, a tap counter responsive to each tap of the contactless card to the device, wherein the tap counter counts each respective tap for the transaction;
   receiving, by the application, an account number associated with the account, an expiration date of the account number, and a card verification value (CVV) associated with the account number; and
   copying, by the application responsive to a first tap of the plurality of taps, one of the account number, the expiration date, and the CVV to a clipboard of an operating system (OS) executing on the device based on a value of the tap counter subsequent to incrementing the tap counter responsive to the first tap of the plurality of taps.

2. The method of claim 1, further comprising:
   receiving encrypted data by the application from the contactless card responsive to a second tap of the plurality of taps, wherein the second tap is prior to the first tap;
   transmitting, by the application, the encrypted data to a server; and
   receiving, by the application from the server, an indication specifying the server decrypted the encrypted data.

3. The method of claim 2, wherein the account number, the expiration date, and the CVV are received from the server or the contactless card based on the server decrypting the encrypted data, wherein the value of the tap counter counts a number of taps of the card to the device.

4. The method of claim 3, wherein the account number, the expiration date, and the CVV are received from the contactless card based on the number of taps counted by the tap counter.

5. The method of claim 1, further comprising:
   determining, by the application, that the value of the tap counter subsequent incrementing the tap counter responsive to the first tap of the plurality of taps is associated with copying the account number to the clipboard;
   copying, by the application, the account number to the clipboard; and pasting, by the OS, the account number to an account number form field.

6. The method of claim 1, wherein the account number is encrypted, the method further comprising decrypting the encrypted account number.

7. The method of claim 1, further comprising:
determining, by the device, that a time threshold has expired or the transaction has been completed using the one of the account number, the expiration date, and the CVV to copied to clipboard; and
removing, by the device, the one of the account number, the expiration date, and the CVV from the clipboard based on the time threshold expiring or the transaction being completed.

8. A system, comprising:
a processor; and
a memory storing instructions which when executed by the processor cause the processor to:
detect, by an application executing on the processor, a plurality of taps of a contactless card to a device comprising the processor, the contactless card associated with an account, wherein each of the plurality of taps brings the card within wireless communications range of the device for a transaction, wherein each respective tap causes a different data set to be wirelessly transmitted to the application for the transaction;
increment, by the application, a tap counter responsive to each tap of the contactless card to the device, wherein the tap counter counts each respective tap for the transaction;
receive, by the application, an account number associated with the account, an expiration date of the account number, and a card verification value (CVV) associated with the account number; and
copy, by the application responsive to a first tap of the plurality of taps, one of the account number, the expiration date, and the CVV to a clipboard of an operating system (OS) executing on the processor based on a value of the tap counter subsequent to incrementing the tap counter responsive to the first tap of the plurality of taps.

9. The system of claim 8, the memory storing instructions which when executed by the processor cause the processor to:
receive encrypted data by the application from the contactless card responsive to a second tap of the plurality of taps, wherein the second tap is prior to the first tap;
transmit, by the application, the encrypted data to a server; and
receive, by the application from the server, an indication specifying the server decrypted the encrypted data.

10. The system of claim 9, wherein the account number, the expiration date, and the CVV are received from the server or the contactless card based on the server decrypting the encrypted data, wherein the value of the tap counter counts a number of taps of the card to the device.

11. The system of claim 10, wherein the account number, the expiration date, and the CVV are received from the contactless card based on the number of taps counted by the tap counter.

12. The system of claim 8, the memory storing instructions which when executed by the processor cause the processor to:
determine, by the application, that the value of the tap counter subsequent incrementing the tap counter responsive to the first tap of the plurality of taps is associated with copying the account number to the clipboard,
copy, by the application, the account number to the clipboard; and
paste, by the OS, the account number to an account number form field.

13. The system of claim 8, wherein the account number is encrypted, the memory storing instructions which when executed by the processor cause the processor to:
decrypt the encrypted account number.

14. The system of claim 8, the memory storing instructions which when executed by the processor cause the processor to:
determine, by the device, that a time threshold has expired or the transaction has been completed using the one of the account number, the expiration date, and the CVV to copied to clipboard; and
remove, by the device, the one of the account number, the expiration date, and the CVV from the clipboard based on the time threshold expiring or the transaction being completed.

15. A non-transitory computer-readable storage medium having computer-readable program code embodied therewith, the computer-readable program code executable by a processor to cause the processor to:
detect, by an application executing on the processor, a plurality of taps of a contactless card to a device comprising the processor, the contactless card associated with an account, wherein each of the plurality of taps brings the card within wireless communications range of the device for a transaction, wherein each respective tap causes a different data set to be wirelessly transmitted to the application for the transaction;
increment, by the application, a tap counter responsive to each tap of the contactless card to the device, wherein the tap counter counts each respective tap for the transaction;
receive, by the application, an account number associated with the account, an expiration date of the account number, and a card verification value (CVV) associated with the account number; and
copy, by the application responsive to a first tap of the plurality of taps, one of the account number, the expiration date, and the CVV to a clipboard of an operating system (OS) executing on the processor based on a value of the tap counter subsequent to incrementing the tap counter responsive to the first tap of the plurality of taps.

16. The non-transitory computer-readable storage medium of claim 15, further comprising computer-readable program code executable by the processor to cause the processor to:
receive encrypted data by the application from the contactless card responsive to a second tap of the plurality of taps, wherein the second tap is prior to the first tap;
transmit, by the application, the encrypted data to a server; and
receive, by the application from the server, an indication specifying the server decrypted the encrypted data.

17. The non-transitory computer-readable storage medium of claim 16, wherein the account number, the expiration date, and the CVV are received from the server or the contactless card based on the server decrypting the encrypted data, wherein the value of the tap counter counts a number of taps of the card to the device.

18. The non-transitory computer-readable storage medium of claim 17, wherein the account number, the expiration date, and the CVV are received from the contactless card based on the number of taps counted by the tap counter.

19. The non-transitory computer-readable storage medium of claim 15, further comprising computer-readable program code executable by the processor to cause the processor to:
- determine, by the application, that the value of the tap counter subsequent incrementing the tap counter responsive to the first tap of the plurality of taps is associated with copying the account number to the clipboard;
- copy, by the application, the account number to the clipboard; and
- paste, by the OS, the account number to an account number form field.

20. The non-transitory computer-readable storage medium of claim 15, further comprising computer-readable program code executable by the processor to cause the processor to:
- determine, by the device, that a time threshold has expired or the transaction has been completed using the one of the account number, the expiration date, and the CVV to copied to clipboard; and
- remove, by the device, the one of the account number, the expiration date, and the CVV from the clipboard based on the time threshold expiring or the transaction being completed.

* * * * *

UNITED STATES PATENT AND TRADEMARK OFFICE
CERTIFICATE OF CORRECTION

Page 1 of 1

PATENT NO. : 11,069,173 B2
APPLICATION NO. : 16/998499
DATED : July 20, 2021
INVENTOR(S) : Daniel Herrington et al.

It is certified that error appears in the above-identified patent and that said Letters Patent is hereby corrected as shown below:

In the Claims

Column 24, Claim 12, Line 3; Please replace: "clipboard," with --clipboard;--

Column 24, Claim 15, Line 35; Please replace: "transmitted to the application for the transaction," with --transmitted to the application for the transaction;--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*